Dec. 29, 1953  M. C. ARMSTRONG  2,664,406
FISSURED TILE COMPOSED OF GLASS FIBERS, GYPSUM
CEMENT, AND AMINE-ALDEHYDE RESIN, AND
METHOD OF MAKING SAME
Filed Dec. 9, 1950
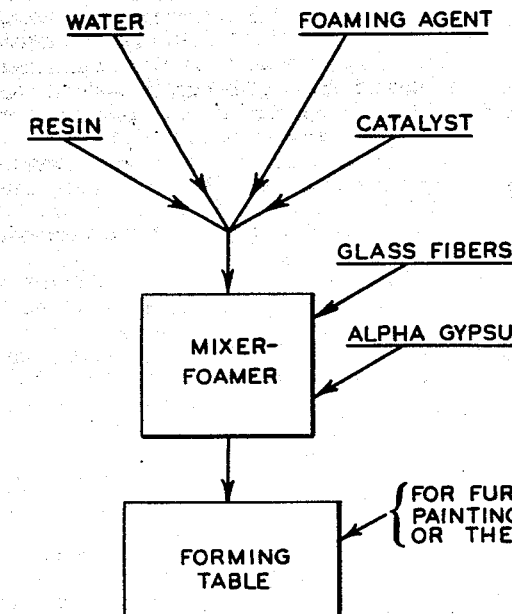
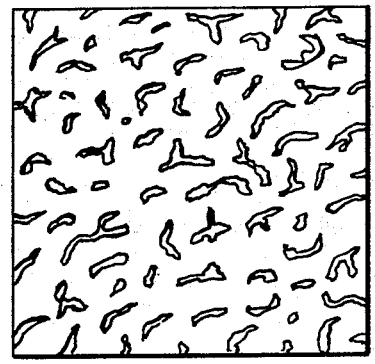
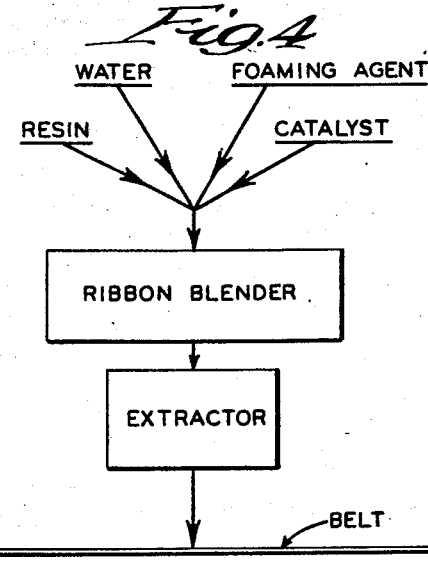
INVENTOR:
Marshall C. Armstrong,
BY
Starkin & Overman
ATTORNEYS.

Patented Dec. 29, 1953

2,664,406

UNITED STATES PATENT OFFICE 2,664,406

FISSURED TILE COMPOSED OF GLASS FIBERS, GYPSUM CEMENT, AND AMINE-ALDEHYDE RESIN, AND METHOD OF MAKING SAME

Marshall C. Armstrong, Hebron, Ohio, assignor to Owens-Corning Fiberglas Corporation, a corporation of Delaware Application December 9, 1950, Serial No. 200,077

9 Claims. (Cl. 260—2.5)

This invention relates to the manufacture of acoustical and structural tile and it relates more particularly to the manufacture of fissured tile which may be used in ceiling structures and the like.

An object of this invention is to produce tile of the type described which has attractively arranged fissures on the outer surface and is fissured also substantially throughout the entire body thereof, and it is a related object to produce a fissured tile of the type described which has no definite pattern of fissures within and on the surface thereof.

Another object is to produce an acoustical or structural tile of the type described which is substantially inorganic in nature such that it is incombustible and resistant to relatively high temperatures to which the acoustical or structural tile might be exposed as an incidence to normal use.

A further object is to produce an acoustical or structural tile of the type described which does not require a facing and which may be fabricated with color throughout the body thereof.

A still further object is to produce an acoustical or structural tile embodying a relatively high concentration of reinforcing glass fibers as compared to products heretofore produced with similar types of bonding agents.

A still further object is to produce and to provide a method for producing fissured tile on an economical mass production basis which requires relatively simple equipment and inexperienced labor while enabling reproduction of products of uniform character from batch to batch.

A still further object is to produce and to provide a method for producing fissured tile having high strength and good sound absorbing coefficient and which may be readily handled and easily cut to size for use alone or with metal splines in effecting an assembled relation.

These and other objects and advantages of this invention will hereinafter appear and for purposes of illustration, but not of limitation, an embodiment of the invention is shown in the accompanying drawing in which—

Figure 1 is a diagrammatic flow sheet of the steps involved in the practice of this invention;

Figure 2 is a top plan view of the finished surface of a tile prepared in accordance with this invention;

Figure 3 is a sectional elevational view of a portion of a tile prepared in accordance with this invention, and Figure 4 is a flow sheet of a modified system for manufacturing tile embodying features of this invention.

The use of glass fibers as a reinforcement in structural tile has been the subject of considerable research because of the desire to make maximum use of such high strength, inert, rot and fungus resistant, and incombustible fibers in structural products, such as building tile and the like. A large proportion of the earlier investigations on the use of such materials has centered about the development of an inorganic binder which would enable most effective use of the reinforcing glass fibers and which would permit use thereof in relatively high concentration.

Particular attention has been given to the use of hydraulic cements as inorganic binders for glass fibers. In the main, these have been found to be unsuitable because their short tank life does not lend itself to present methods of application or integration of the binder onto glass wool fibers and because of difficulties encountered in spraying such cement slurries. Further objection resides in the lack of plastic flow in the material during the curing period. Most important is the difficulty in mixing hydraulic cements directly with glass fibers because of the relatively large bulk volume of the glass fibers coupled with the lack of flow of the cement with minimum moisture content with the result that it has been practically impossible heretofore to incorporate glass fibers in concentrations greater than 10 per cent by weight. If more than 10 per cent glass fibers were incorporated in slurries of the type heretofore produced, the resulting mixture would be too viscous to handle.

It has been found that glass fibers in concentrations as high as 60 per cent by weight can be incorporated as a reinforcement in tile employing gypsum cement as the binding agent when an amide-aldehyde resin is employed in combination with the cement and composition is foamed to provide increased volume without increasing the concentration or ratio of water beyond limits desired for developing highest strength of the cement and with the resulting development of voids beneficial in acoustical insulation or structural tile of the type described. In the practice of this invention, glass fibers are incorporated in amounts ranging from 20-60 per cent by weight of the product.

It has been found further that when the foamed mixture of amide-aldehyde resin and glass fibers are mixed with the gypsum cement and cast upon smooth surfaces for setting, fissures are formed naturally by the discontinuity of the mass as the mass is formed into boards or molded into tile and allowed to set on such smooth surfaces. The fissures seem to form naturally throughout the body of the tile and in a non-uniform pattern on the surface of the tile so as to provide a useful insulation product having a very attractive appearance.

The possibility of incorporation of larger amounts of glass fibers than has heretofore been considered possible appears to result from the combination of increased volume of the other phases when foamed so as to minimize the effect of the large bulk volume of the glass fibers per unit area, without otherwise increasing the solids content, and the greater fluidity which results from the preferred use of gypsum characterized by low "normal consistency" (below 50), defined as the amount of water by weight required to produce a slurry of definite fluidity when mixed with 100 parts of the gypsum cement.

It has been found that the combination of elements herein described permits the incorporation of larger concentrations of reinforcing glass fibers notwithstanding the use of minimum amounts of water so that substantially the full water complement of water required to set the gypsum cement can be derived from the aqueous solution of the amide-aldehyde resin incorporated in an intermediate water soluble stage of polymeric growth. As a result, drying steps may be substantially eliminated and optimum conditions for the production of a high strength product are caused to exist.

More specifically, in the practice of this invention, an amide-aldehyde resin is foamed by constant agitation with the desired amount of make-up water, foaming agent and an acidic catalyst for bringing about the cure of the amide-aldehyde resin. The desired amount of glass wool fibers are introduced with continued mixing to continue the foaming operation. The volume of the materials thus incorporated may be caused to increase 2 to 5 fold under such conditions—the amount of foaming may be standardized from batch to batch by indications for volume or the like in the foaming chamber. Gypsum cement is then introduced and well dispersed into the foamed composition and the mass is then transferred for setting into suitable molds or rolled or otherwise formed into predetermined shapes or tiles on a smooth surfaced support. The mass sets rapidly and can usually be handled within ten to twenty minutes without the use of heat, although heat may be employed further to accelerate the set of the cement and the cure of catalytically activated amide-aldehyde resin. When the surface upon which the mass is cast or deposited comprises a layer of a polyvinyl plastic, the cured section can be readily removed without the use of mold release compounds or materials, otherwise it is desirable to treat the surface for enabling rapid and easy release.

As the amide-aldehyde resin, use may be made of urea formaldehyde or melamine formaldehyde resin. Dicyandiamide formaldehyde resin has been found to be unsuitable for the purpose intended but there is reason to believe that other urea type resinous materials having a water soluble intermediate stage and a final curing stage may be used, such for example, as guanidine formaldehyde, biguanidine formaldehyde and the like. Such resinous materials are best employed in amounts ranging from 1 part by weight amide-aldehyde resin to 4 parts by weight gypsum cement to 1 part by weight of the resin to 8 parts by weight of the gypsum cement. It is possible to use more resin up to equal parts by weight of the cement but no advantage is derived from such increased concentration while the cost is correspondingly raised.

Potassium, sodium and ammonium salts of rosins and the sodium, potassium and ammonium salts of alkyd sulfonic acids or sulphates have been used as the foaming agent and it is preferred to employ sodium lauryl sulphate (Duponal M. E.). The amount of foaming agent is not critical but it is best to use from 0.5 to 3.0 per cent based upon a combined weight of the resin and water. One per cent by weight foaming agent is usually preferred in the usual practice in accordance with this invention.

The acidic catalytic agent for advancing the reaction of the urea aldehyde resinous material may be selected of mineral acids of the type hydrochloric acid and sulfuric acid, or it may be selected of acid salts of the type ammonium chloride, stannic chloride, zinc chloride, iron chloride, aluminum trichloride and the like. The amount of catalyst depends upon the type of resinous material employed and the type of catalytic agent. For example, amounts up to 0.5 to 2 per cent of the acid salts are employed particularly with urea aldehyde resins and up to 5 to 10 per cent of the inorganic acids may be employed especially with melamine-aldehyde resins. By way of illustration, catalysts ranging in amounts of 0.5 per cent mineral acids to 10 per cent by weight acid salts based upon the amount of resin may be used.

Gypsum cement best adapted for use in the practice of this invention comprises calcium sulphate hemihydrate ($CaSO_4 \cdot \tfrac{1}{2}H_2O$) prepared by calcination of gypsum rock at approximately 250° F. under positive steam pressure in an autoclave without agitation. The resulting product, hereinafter referred to as alpha-gypsum, is usually in the form of relatively large dense, stubby shaped crystals which are non-porous in character. Because of their low water absorption and lessened surface area per unit weight, considerably less water is required to produce a slurry having fluidity comparable with gypsum cement otherwise prepared, as by the normal manner of calcining finely ground gypsum rock at 350° F. under atmospheric conditions. By the latter method, a non-uniform, absorbent, finely divided product is produced characterized by "normal consistency" of about 80 to 90 while alpha-gypsum has low "normal consistency" in the range of 40 to 50.

Thus less water is required to secure the desired fluidity in the use of alpha-gypsum and in many instances the water employed to dissolve the urea aldehyde type resin is sufficient to supply the 18.6 parts of water per 100 parts by weight gypsum cement to form the cured dihydrate ($CaSO_4 \cdot 2H_2O$). In any event, the amount of water that need be supplied in addition to that incorporated with the resinous material is a minimum so that subsequent drying does not present a problem and the use of such lesser amounts of water per unit weight of cement over and above that theoretically required to set the cement enables the attainment of optimum conditions for developing highest strength in the end product. In the use of alpha-cement, water in amounts ranging from 40–50 parts per 100 parts of alpha-cement is all that is required.

It will be understood that this invention may also be practiced, in part, in the use of normal gypsum cement whereby larger amounts of glass fibers are incorporated into the end product by the foaming technique in combination with amide-aldehyde resinous materials but in the use of such normal cements it is usually found best to incorporate larger amounts of water up to 80-90 parts by weight per 100 parts cement and to follow the casting into tile or blocks with a heat treatment to accelerate the removal of excess water and the cure of the amide-aldehyde resinous material.

The glass fiber component may be selected of glass wool fibers attenuated by the impact of high pressure steam or air directed angularly upon molten streams of glass or may be selected of continuous fibers drawn at high speed from numerous streams of molten glass issuing from melting bushings and then cut to shorter lengths. Such fibers may be in the form of strands, yarns or bundles and it is preferred to make use of individual filaments with, but preferably without, size or lubricant thereon.

The following examples are given by way of illustrating the manufacture of fissured acoustical tile and formulations which may be used therefor.

*Example 1*

| | Parts by weight |
|---|---|
| Alpha-gypsum cement | 4 |
| Melamine aldehyde resin in water solution | 1 |
| Water | 1.6 |
| Glass wool fibers | 4 |
| Sodium lauryl sulphate (Duponal M. E.) | 0.026 |
| 37 per cent hydrochloric acid | 0.02 |

*Example 2*

| | Parts by weight |
|---|---|
| Alpha-gypsum cement | 4 |
| Urea formaldehyde resin (60 per cent solids in water solution) | 1 |
| Water | 1.1 |
| Continuous glass fibers cut to about ½ inch lengths | 4 |
| Foaming agent | 0.2 |
| Ammonium chloride | 0.05 |

*Example 3*

| | Parts by weight |
|---|---|
| Alpha-gypsum cement | 4 |
| Urea formaldehyde resin (67 per cent solids in water solution) | 0.7 |
| Water | 1.75 |
| Glass wool fibers | 4 |
| Sodium lauryl sulphate | 0.025 |
| Ammonium chloride | 0.025 |

*Example 4*

| | Parts by weight |
|---|---|
| Alpha-gypsum cement | 4 |
| Urea formaldehyde resin (50 per cent solids in water solution) | 2 |
| Water | 0.6 |
| Glass fibers | 2 |
| Foaming agent | 0.05 |
| Ammonium chloride | 0.05 |

*Example 5*

| | Parts by weight |
|---|---|
| Alpha-gypsum cement | 4 |
| Melamine aldehyde resin (60 per cent solids in water solution) | 1 |
| Water | 0.6 |
| Glass wool fibers | 2.5 |
| Foaming agent | 0.025 |
| 37 per cent sulfuric acid | 0.02 |

In each instance, the urea or melamine aldehyde resin is combined with the water, foaming agent (sodium lauryl sulphate) and acid catalyst (hydrochloric acid or ammonium chloride) and agitated for mixing and foaming. The full complement of glass fibers are then incorporated slowly into the mixture with continued agitation until the foamed composition rises to a measured volume which is selected to be about 3-5 times the theoretical volume of the materials.

The gypsum cement is then added with continued mixing until the cement is fully dispersed. Since setting starts immediately and will take place to the extent that the product can be handled within 10-20 minutes from the time the gypsum cement is added, the mix is transferred rapidly onto a forming table where it can be molded, rolled or otherwise formed into desired sections. It is at this stage of the reaction, when the mass is spread out to set on a smooth surface, that fissures form in the face adjacent the smooth surface and also form throughout the body of the board or tile. If the mass is spread or deposited for setting upon a polyvinyl plastic surface, such as polyvinyl chloride and vinyl chloride-vinyl acetate copolymers, or polyvinylidine chloride, or polyvinyl acetal plastic in the form of films or sheets, little adhesion occurs between the set tile and the receiving surface such that removal can be very easily effected. In the event that the receiving surface is not formed of a vinyl plastic, the surface may be otherwise treated with suitable parting compounds.

It is preferred to fabricate the materials from the time that the glass fibers are added by a substantially continuous technique which takes into consideration the critical nature of the materials and the time factor from the time that the gypsum cement is incorporated whereby the product which is produced is substantially uniform in character from day to day. A flow sheet for continuous manufacture is shown in Figure 4. After the glass fibers have been introduced, the composition is incorporated in a ribbon type blender or mixer for receiving and properly distributing the gypsum cement. The ribbon type blender feeds a continuous stream of the blend to an extruding machine of the continuous type which extrudes the ribbon or sheet contoured to correspond to the dimension of the tile or sheet to be produced upon a continuous moving belt where the strip or sheet is allowed to set. Vinyl or rubber belting may be used as the endless forming conveyor so that the set product may be removed without use of releasing agents.

Setting occurs without heat in from 10-20 minutes depending upon the amount of moisture and the character or freshness of the gypsum cement. The amide-aldehyde resin is converted into an insoluble cured state in about 10 minutes in the presence of the acidic condensation catalyst but the resin set and the gypsum cement set can be accelerated by exposure to elevated temperatures, such as up to 300° F.

As previously pointed out, it is desirable to keep the water content as low as possible commensurate with the desired fluidity of the mass and the development of optimum conditions for generating high strength properties in the end product. In each of the above formulations employing alpha-gypsum cement, 40-60 per cent water is the most that is needed based upon the weight of the gypsum cement. In the event that more water can be tolerated, the alpha-gypsum cement may be replaced in whole or in part with normal gypsum cement to produce a new product still having a relatively high concentration of glass fibers resulting from the greater mass area available because of the foaming technique. However, the strength properties and the drying characteristics of compositions wherein normal gypsum cements are substituted are markedly handicapped.

Acoustical tile prepared by either of the formulations of Examples 1–3 inclusive and by the steps later described, results in a highly fissured tile in which the fissures do not acquire a predetermined pattern or direction. The tile has a noise-reduction coefficient of about .55 or better. A tile having a thickness of about 27/32 inch weighs about 1.5 pounds per square foot and has a density of about 20.6 pounds per cubic foot. It enjoys a light reflection of about 71 per cent when unpainted and absorption of less than 0.05 per cent moisture. It is able to withstand exposures up to 200° F. for an indefinite period of time and is wholly incombustible.

It will be understood that inorganic coloring compounds and pigments may be incorporated as an element with the glass fibers in the batch to impart color characteristics throughout the formed structure or else an outer coating may be applied onto the fissured surface to give the desired colored appearance or other attractive features.

It will be understood that numerous other changes may be made in the details of formulation and methods of handling without departing from the spirit of the invention, especially as defined in the following claims.

I claim:

1. Fissured tile consisting essentially of a mixture of glass fibers and a cement in which the fibers are present in amounts ranging from 20–60 percent by weight and in which the cement is formulated of a foamed amino-aldehyde resin solution in water and alpha gypsum cement present in the ratio of 1 part by weight resin to 4–8 parts by weight alpha gypsum.

2. Fissured tile consisting essentially of glass fibers in amounts ranging from 20–60 percent by weight of the final product bonded into a board having fissures on the surface and throughout the body thereof with a substantially inorganic cement formed of 1 part by weight amino-aldehyde resin foamed in water solution to 2–5 times its normal volume and containing water in about the amounts theoretically required to react for setting the gypsum cement and 4–8 parts by weight gypsum having a normal consistency less than 50.

3. Fissured tile consisting essentially of glass fibers in amounts ranging from 20–60 percent by weight of the final product intermixed with a binder formed essentially of 1 part by weight amino-aldehyde resin in water solution, 4–8 parts by weight alpha gypsum cement and a small amount of an agent for foaming the resin solution to 2–5 times its volume and an acidic catalyst for advancing the cure of the amino-aldehyde resin.

4. The method of manufacturing a fissured board of low density consisting essentially of glass fibers in amounts up to 20–60 percent by weight and a gypsum-amino-aldehyde resinous binder combination comprising the steps of foaming an amino-aldehyde resin in water solution, incorporating the glass fibers into the foamed resin while continuing the foaming thereof, mixing gypsum cement into the foamed composition in the ratio of 4–8 parts by weight cement to 1 part by weight resin, and forming the mass to desired shape whereupon the resin-cement binder sets while fissures automatically form in the surface and throughout the body thereof.

5. The method of manufacturing fissured tile having 20–60 percent glass fibers bonded with a cement formed of a combination of gypsum cement and an amino-aldehyde resin comprising the steps of foaming a mixture of an amino-aldehyde resin in water solution with a foaming agent and an acidic compound for curing the resin, continuing the foaming action while introducing the glass fibers, mixing in alpha gypsum cement in the ratio of 1 part resin to 4–8 parts cement, forming the mass to desired shape and allowing the mass to set while fissures automatically form on the surface and throughout the body thereof.

6. The method as claimed in claim 5 in which the foaming agent is a water soluble salt of a sulfonic acid present in amounts ranging from 0.5–3.0 percent by weight of the combined weight of water and resin.

7. In the method as claimed in claim 5 in which foaming is continued upon addition of the glass fibers into the foamed resin until the volume thereof is increased 2–5 times the natural volume of the materials therein.

8. The method as claimed in claim 5 in which the acidic catalytic compound is present in the ratio of 0.5–10 percent by weight of the amino-aldehyde resinous material.

9. The method as claimed in claim 5 in which the amount of water in the binder composition is maintained below 50 percent by weight of the alpha gypsum cement.

MARSHALL C. ARMSTRONG.

References Cited in the file of this patent

UNITED STATES PATENTS

| Number | Name | Date |
|---|---|---|
| 2,373,401 | King | Apr. 10, 1945 |
| 2,442,321 | Cuppett | May 25, 1948 |
| 2,451,446 | Parsons | Oct. 12, 1948 |
| 2,476,306 | King | July 19, 1949 |

FOREIGN PATENTS

| Number | Country | Date |
|---|---|---|
| 231,242 | Great Britain | Mar. 30, 1925 |
| 61,242 | Holland | June 15, 1948 |

OTHER REFERENCES

Koroseal Handbook of Tech. Info., pages 5 and 23, pub. 1942 by B. F. Goodrich Co.